United States Patent
Lee et al.

(10) Patent No.: US 6,881,605 B2
(45) Date of Patent: Apr. 19, 2005

(54) METHOD OF FORMING A DUAL-INTERFACE IC CARD AND A CARD FORMED OF SUCH A METHOD

(75) Inventors: Chi Keung Lee, New Territories (HK); Kwok Lam Kwan, New Territories (HK)

(73) Assignee: Billion Apex Limited, Tortola (VG)

( * ) Notice: Subject to any disclaimer, the term of this patent is extended or adjusted under 35 U.S.C. 154(b) by 366 days.

(21) Appl. No.: 10/044,958

(22) Filed: Jan. 15, 2002

(65) Prior Publication Data

US 2003/0000070 A1 Jan. 2, 2003

(30) Foreign Application Priority Data

Jan. 18, 2001 (GB) .............................................. 0101318

(51) Int. Cl.⁷ .............................................. H01L 21/44
(52) U.S. Cl. ........................ 438/106; 257/679; 29/601; 29/600
(58) Field of Search ........................ 438/106; 257/679; 29/600–601

(56) References Cited

U.S. PATENT DOCUMENTS

| | | |
|---|---|---|
| 5,598,032 A | 1/1997 | Fidalgo |
| 5,809,633 A * | 9/1998 | Mundigl et al. ............... 29/600 |
| 6,081,025 A | 6/2000 | Prancz |

FOREIGN PATENT DOCUMENTS

| | | |
|---|---|---|
| DE | 19505245 | 2/1995 |
| DE | 195 05 245 C1 | 4/1996 |
| DE | 196 10 044 A | 9/1997 |
| DE | 196 33 938 A1 | 2/1998 |
| DE | 19709985 | 9/1998 |
| DE | 19732645 | 9/1998 |
| EP | 0 708 414 A2 | 4/1996 |
| EP | 0967570 | 12/1999 |
| GB | 2 312 089 A | 10/1997 |

OTHER PUBLICATIONS

Search Report–Republic of France, Dec. 12, 2002.

* cited by examiner

Primary Examiner—Luan Thai
(74) Attorney, Agent, or Firm—Pravel Intellectual Property Law, P.C.; James W. Pravel

(57) ABSTRACT

There is disclosed a method of forming a card embedded with an integrated circuit (IC) and an antenna coil, which method including the steps of (a) embedding an antenna coil onto a core sheet; (b) laminating the core sheet with a number of outer sheets to form a laminated panel; (c) forming a first cavity in the laminated panel to expose part of the antenna coil; (d) pulling out two ends of the antenna coil from the core sheet; and (e) securing the integrated circuit with the antenna coil, e.g. by soldering or thermo compression bonding.

11 Claims, 10 Drawing Sheets

METHOD OF FORMING A DUAL-INTERFACE IC CARD AND A CARD FORMED OF SUCH A METHOD

This invention relates to a method of forming a card embedded with at least one integrated circuit, generally known as an "IC Card" or "Smart card". In particular, this invention relates to a method of forming an IC card also embedded with an antenna coil, and an IC card formed of such a method.

Cards have long been used as a data carrier. Ordinary cards may carry data visually, e.g. having information or the like printed or written on one or both surfaces of the card. Cards may also act as magnetic data carriers in the form of magnetic cards. In magnetic cards, a magnetic strip is pressed on a particular location of a card. The magnetic strip carries data which are readable by a magnetic data reader. Magnetic cards may be used as train tickets, bank cards etc. Such magnetic cards, however, suffer from the drawback that the amount of data which can be carried or stored by a magnetic strip is small. In addition, magnetic cards can only be over-written a relatively small number of times, and are easily damaged. Magnetic cards are also prone to be affected by magnetic fields in the environment, and may even lose the data stored therein.

As an improvement over the above conventional data-carrying cards, "smart cards" or "IC cards" have been provided. Such are cards embedded with an integrated circuit (IC) for storing data. With existing technology, an IC can store over 30 k byte of data, and can be over-written and read for over 100,000 times. As the IC can contain both the data and the programme, the smart cards can be used remote of a computer terminal. IC cards are used as telephone cards or credit cards. Such cards sometimes also include a magnetic strip, thus providing two interfaces.

IC cards may be generally classified as contact cards and contact-less cards. For contact cards, at least a major surface of the IC with a read/write interface is exposed to the outside environment. When in use, the read/write interface of the IC card is in direct physical contact with a read/write head of a computer terminal or processor, whereby data may be written into and/or read from the IC in the card. On the other hand, a contact-less card is provided with coils of a copper wire, which is secured at or adjacent to its two ends with the IC, which is fully embedded within the IC card. The coil of copper wire acts as an antenna for transmitting and/or receiving radio frequency signals. The IC may then be coupled to an external system, e.g. a computer system, by radio frequency (RF) transmission. In this case, the IC needs not be in direct contact with any read/write head of the external computer system.

If a contact IC card is frequently used, say once or twice a day or more, the IC of the card will be easily damaged. In certain circumstances, the use of contact cards will also be more time-consuming. For example, for paying highway toll, the use of contact cards will mean that each car passing through a toll counter will have to stop for processing payment. Contact-less cards are thus appropriate for use in transactions which are relatively frequent but involve relatively small amount of money.

Contact-less IC cards may be further classified as high-frequency contact-less IC cards and low-frequency contact-less IC cards. The operating frequency of a high-frequency contact-less IC card (also called a high-frequency card) is 13.56 MHz, while that of a low-frequency contact-less IC card (also called a low-frequency card) is 125 kHz. A high-frequency card is provided with a coil of 4 to 5 rounds of copper wire, and the operation distance is within roughly 10 cm. The chance of a high-frequency card accidentally affecting, or being affected by, the operation of other nearby high-frequency cards is small, and is thus very reliable. For a low-frequency card, such is provided with a coil of 250 to 300 rounds of a copper wire. While the manufacture of low-frequency cards is rather complicated and not readily susceptible to automation, its main advantage is that its operation distance may be up to 3 m.

High-frequency cards are usually adopted for personal use, e.g. for travelling on trains or buses. As to low-frequency cards, such may be used for paying highway tolls, as the radio frequency signals can be transmitted through a long distance and it is relatively easy to differentiate between different cars.

For high-frequency cards, there are mainly three ways of providing a coil in the card, namely by printing, by etching, and by embedding. In the printing method, electrically-conductive ink is printed on a core sheet to form a coil of several rounds. Such a method is quick and requires relatively inexpensive equipment. However, such a method suffers from the shortcoming that the printed "wire" is easily broken. In addition, the electrical resistance is not uniform as the electrical conductivity depends on the mixing between some electrically-conductive metal powder and ink. The circuit so printed out is also very thin, and cannot pass the bending test required under the relevant International Standard. Furthermore, in the printing method, the adjacent rounds of wire cannot get too close to each other, and such significantly reduces the effectiveness of radio frequency transmission. Due to the above various problems, this method is now seldom used.

Turning to the etching method, such is similar to that used in producing circuit boards. However, as the adjacent rounds of wire cannot get too close to each other, the effectiveness of radio frequency transmission is compromised. In addition, there is the problem of pollution to the environment during production. Neither can the card so produced pass the bending test. This method is thus also seldom used.

As to the embedding method, such is very versatile and two adjacent rounds of wire can virtually contact each other, the effectiveness of radio frequency transmission is greatly enhanced. Such a method is susceptible to automation, with no adverse effect to the environment. A card produced by such a method can also pass the bending test.

Recently, in addition to contact cards and contact-less cards, a kind of card which combine the functions of contact cards and contact-less cards has been proposed. Such card is called a Combi Card or a Dual-Interface IC Card. For the purpose of convenience, the term "Combi card" will henceforth be used herein. While a Combi card is embedded with an integrated circuit (IC), as in the case of contact card, a major surface of the IC is exposed to allow a read/write head of an external system to physically contact the IC to read data from or write data into the IC. On the other hand, as in the case of contact-less card, the IC of a Combi card is also electrically connected with an antenna coil embedded within the card, so that the IC may be coupled to an external system by means of radio frequency transmission, so that, again, data can be read from or written into the IC. This allows the Combi card to be used in more diverse circumstances.

In an existing method of producing of Combi cards, the IC is secured to the antenna coil by a conductive adhesive. A shortcoming of this method is that the physical connection between the antenna coil and the IC is not sufficiently strong, and cannot therefore pass the requirements of ISO-7816-1 and ISO10536-1.

It is thus an object of the present invention to provide a method of forming an IC card in which the aforesaid shortcoming is mitigated, or at least to provide a useful alternative to the public.

According to a first aspect of the present invention, there is provided a method of forming a card embedded with at least one integrated circuit and an antenna coil, said method including the steps of (a) embedding an antenna coil onto a core sheet; (b) laminating said core sheet with at least two outer sheets to form a laminated panel; (c) forming at least a first cavity in said laminated panel to expose part of said antenna coil; (d) pulling out at least one end of said antenna coil from said core sheet; and (e) securing said integrated circuit with said antenna coil.

According to a second aspect of the present invention, there is provided a card embedded with at least one integrated circuit and an antenna coil, wherein at least a major surface of said integrated circuit is exposed to the outside environment, wherein said antenna coil is fully embedded within said card, wherein said antenna coil is electrically connected with said integrated circuit, and wherein said antenna coil and said integrated circuit are secured with each other by soldering or thermo compression bonding.

An embodiment of the present invention will now be described, by way of example only, and with reference to the accompanying drawings, in which:

FIG. 3A is an enlarged view of the part encircled in FIG. 3;

FIGS. 1 and 1A show a core sheet 10 embedded with several rounds of a copper wire 12 forming an antenna coil in a conventional method. In the prior art method, an integrated circuit is secured to the antenna coil by a conductive adhesive, and the resultant card usually cannot pass the relevant ISO tests.

Figures 1, 1A:
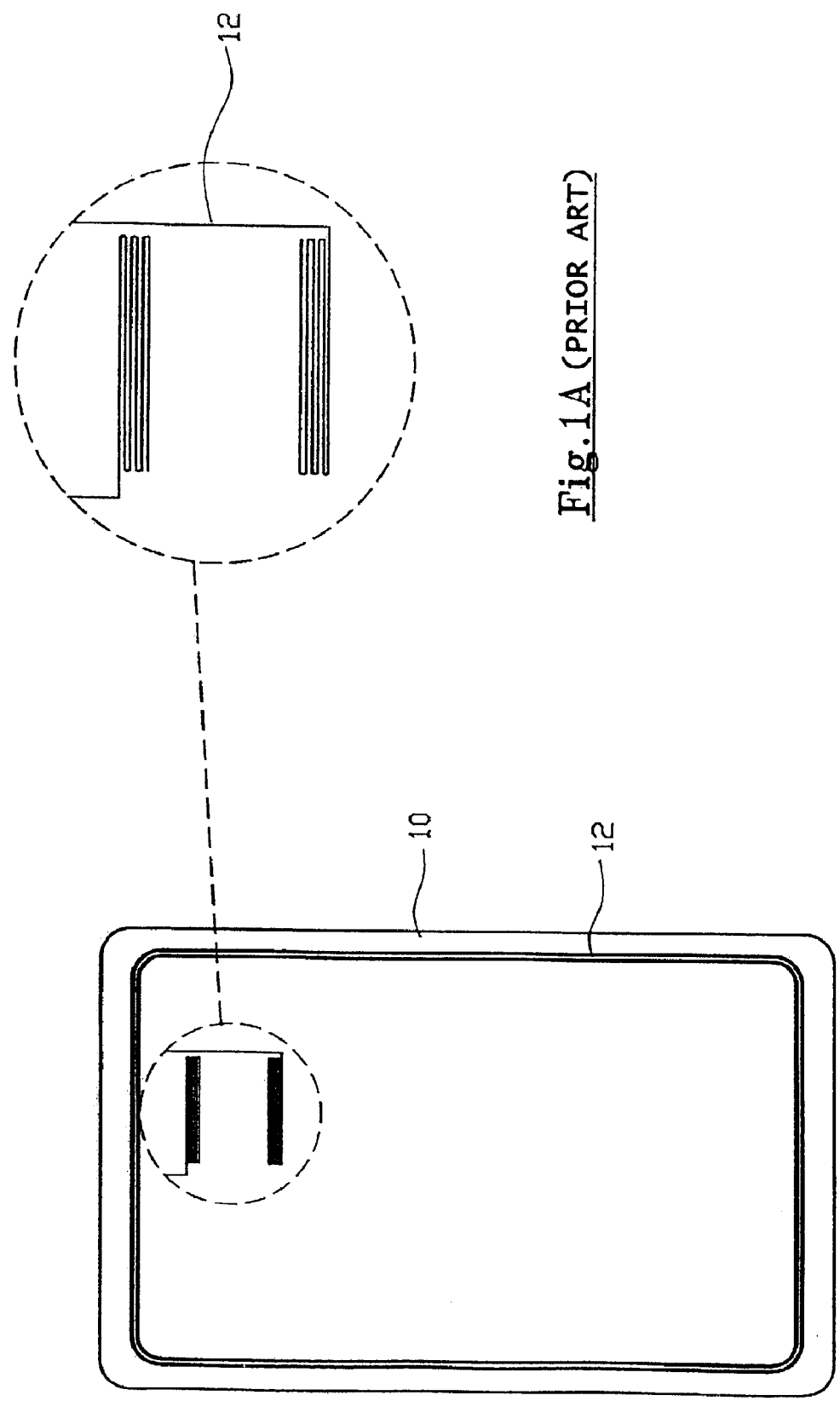
FIG. 1 shows the pattern of an antenna coil on a core sheet of a prior art combi card.
FIG. 1A is an enlarged view of the part encircled in FIG. 1.
Figure 2:
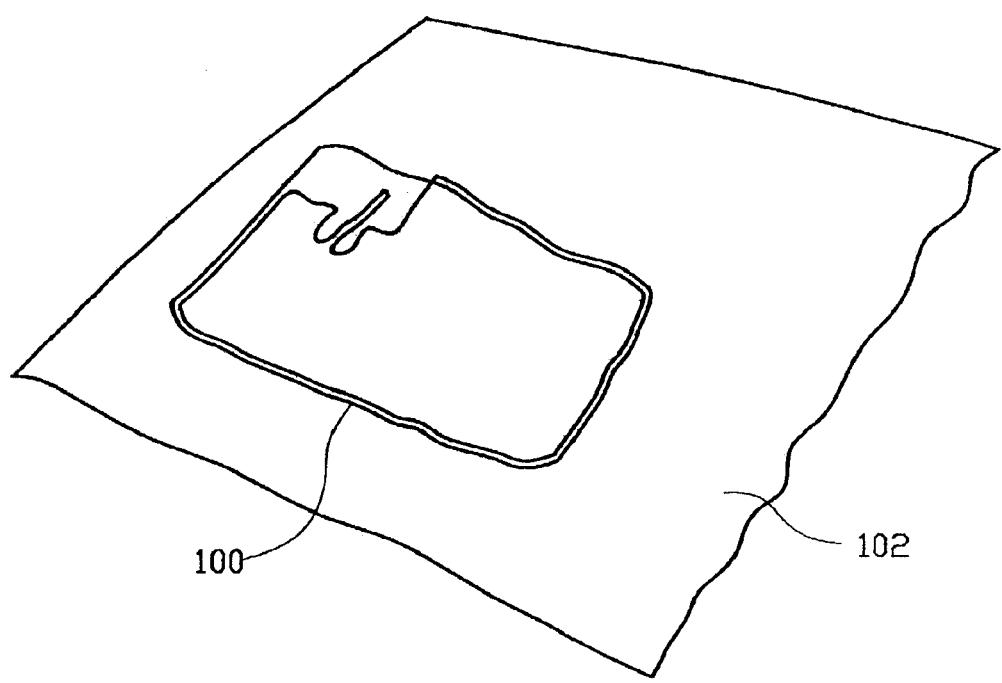
FIG. 2 shows the pattern of an antenna coil on a core sheet, according to the present invention.
Figure 3:
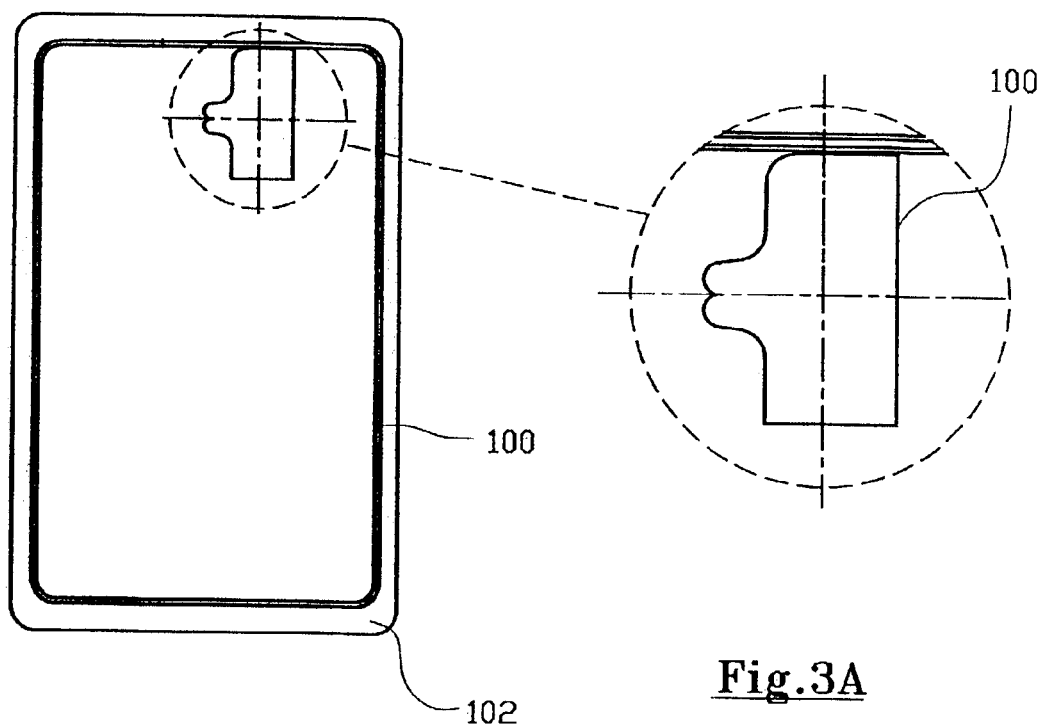
FIG. 3 is a top view of the pattern shown in FIG. 2.

According to the present invention, a copper wire 100 is embedded onto a core sheet 102, as shown in FIGS. 2 to 3A. The core sheet 102 is usually made of a thermoplastic material (e.g. plexiglass, polyvinyl chloride, polypropylene and acrylonitrile butadiene-styrene), or a heat resistant material (e.g. epoxy-fiberglass) coated with a thin layer (e.g. about half the diameter of the wire 100) of a partially cured thermoset adhesive. The wire 100 is delivered from a wiring machine onto the core sheet 102. The wiring machine includes an ultrasonic generator which activates a drive coil. The drive coil in turn drives an ultrasonic transducer, which is provided with a stylus at its end. The stylus includes a groove which fits the shape of the wire 100. Two leaf spring suspensions are provided in the machine for supporting the ultrasonic transducer.

With this arrangement, the stylus may be set into up-and-down vibrational movement at an ultrasonic frequency. Such a vibration creates heat which melts the material of the core sheet 102 under the wire 100. Downward force on the stylus will push the wire 100 into the core sheet 102. The softened thermoplastic material will quickly harden when the stylus moves upward, thus locking the wire 100 in place in the core sheet 102. At the end of the path, the wire 100 is cut by a small shear near the tip of the stylus. The wire 100 so embedded will form an antenna coil for reception and transmission of radio frequency signals, whereby data may be written into and/or read from the IC.

The advantage of ultrasonic bonding is that heat is generated within the substrate (i.e. the core sheet 102) itself by the mechanical stresses of the vibration. This produces heat very rapidly at exactly the place it is required, namely in a small volume underneath the wire 100. Since the heating is very localized and occurs only in the substrate, the material solidifies again as soon as the stylus has passed. The ultrasonic heating is so rapid that the substrate under the wire 100 melts before any heat can be conducted away. Adjacent substrate, even as close as a single wire diameter, is completely unaffected. This enables the bonding to proceed at a linear speed of several inches per second without affecting the wires 100 already bonded.

The wire 100 is usually of solid copper with a tough and elastic insulating coating, e.g. polyimide, polyester and polyurethane. Polyimide is particular suitable for complex patterns because it resists mechanical breakdown at crossovers. A thin (e.g. 0.0005 to 0.01 inch) coating of bonding material may be added to the wire 100 to allow more than one layers of wires 100 to be bonded. The wire 100 may be applied onto the core sheet 102 at a rate of 5 to 15 feet per minute, depending on the application.

Figure 4:
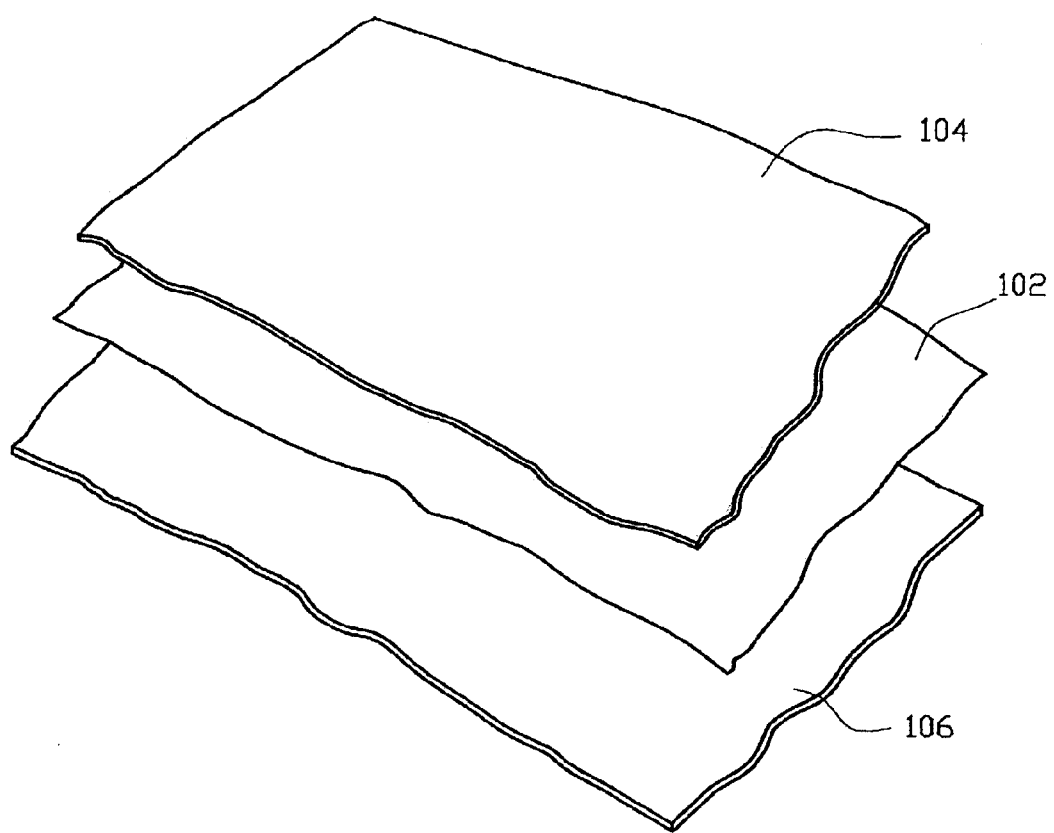
FIG. 4 shows the core sheet to be piled up and aligned with various base sheets for lamination according to the present invention.

The core sheet 102 may then be positioned between various outer sheets 104, 106 and aligned for lamination, as shown in FIG. 4. Although only two outer sheets 104, 106 are shown, it should be understood that more outer sheets may be employed. Such outer sheets 104, 106 may include filler sheets, protective sheets, graphical printing sheets, and outer transparent sheets, depending on the purpose of the product card.

Figure 5:
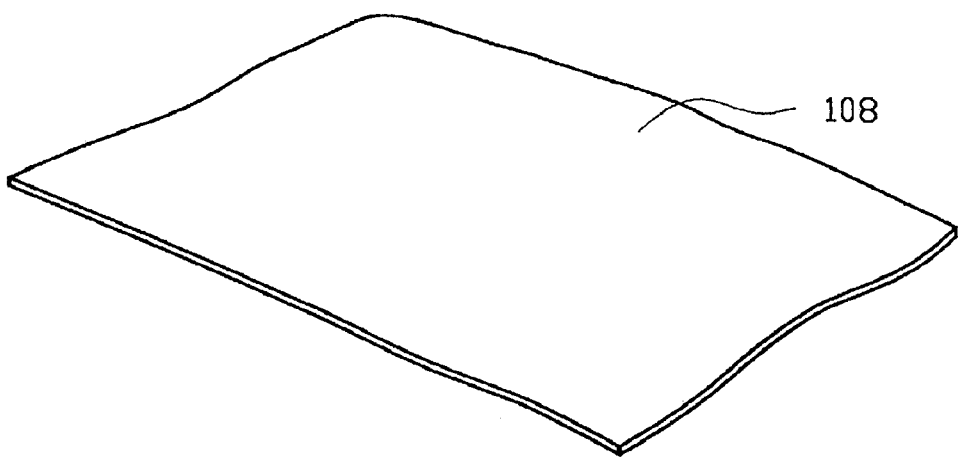
FIG. 5 shows a laminated panel after lamination of the core sheet and outer sheets shown in FIG. 4.
Figure 6:
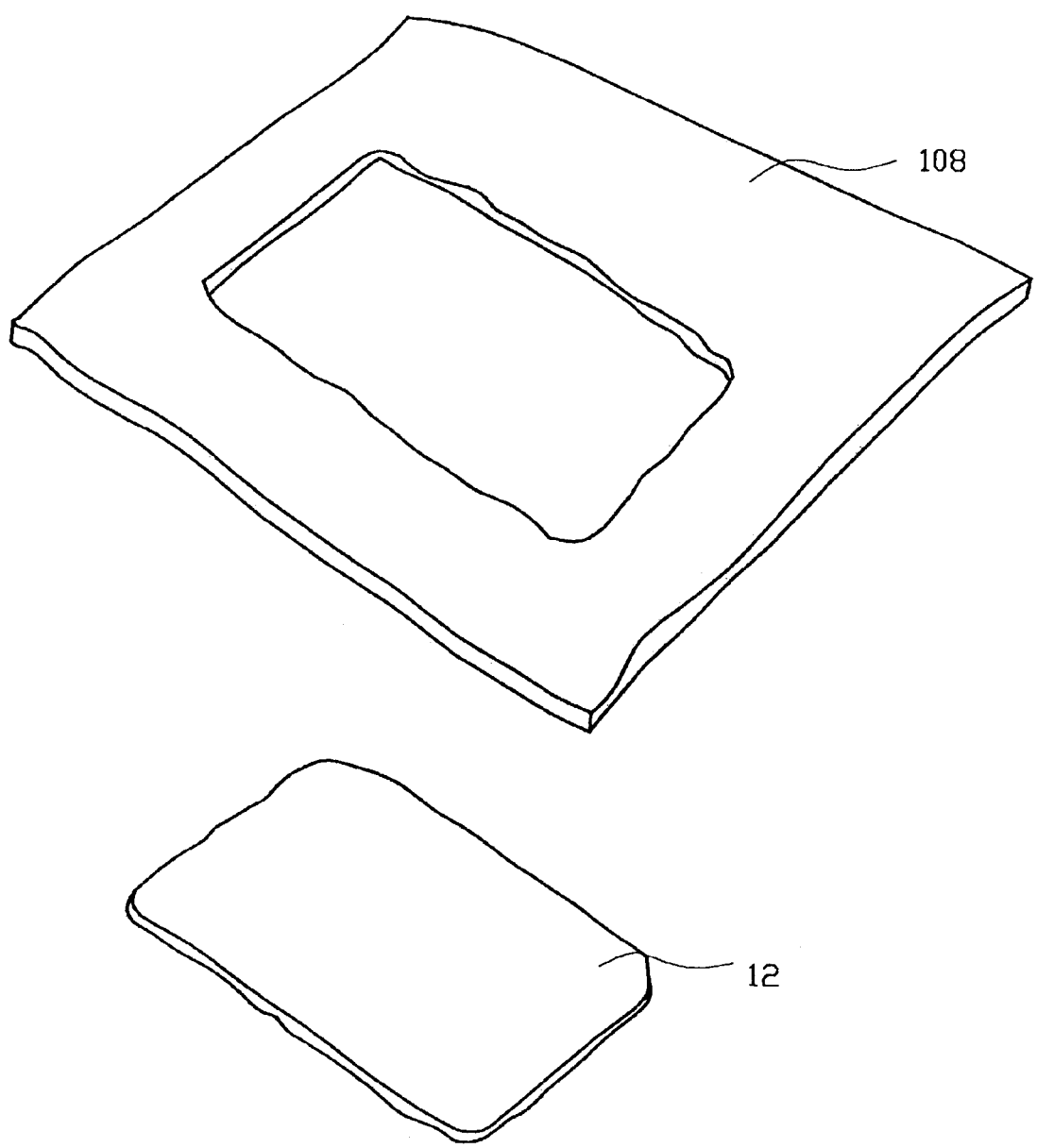
FIG. 6 shows a card punched out from the laminated panel shown in FIG. 5.

When the outer sheets 104, 106 and the core sheet 102 are properly piled up and aligned with one another, such will be spot-welded to ensure that they will remain at the proper relative position during lamination. During lamination, the piled up and aligned core sheet 102 and outer sheets 104, 106 will be secured with one another under pressure and high temperature in a lamination machine, to form a laminated card panel 108, as shown in FIG. 5. A card 110 may then be cut out from the card panel 108 by punching, as shown in FIG. 6, for further process.

Figure 7:
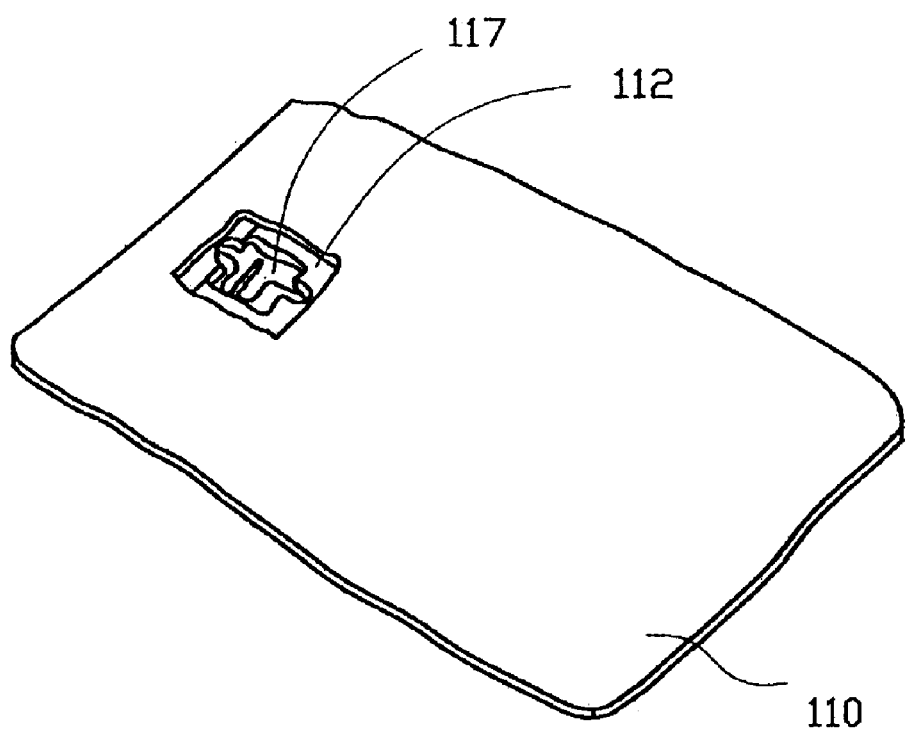
FIG. 7 shows the card after formation of a first trough and a second trough according to the present invention.
Figure 8:
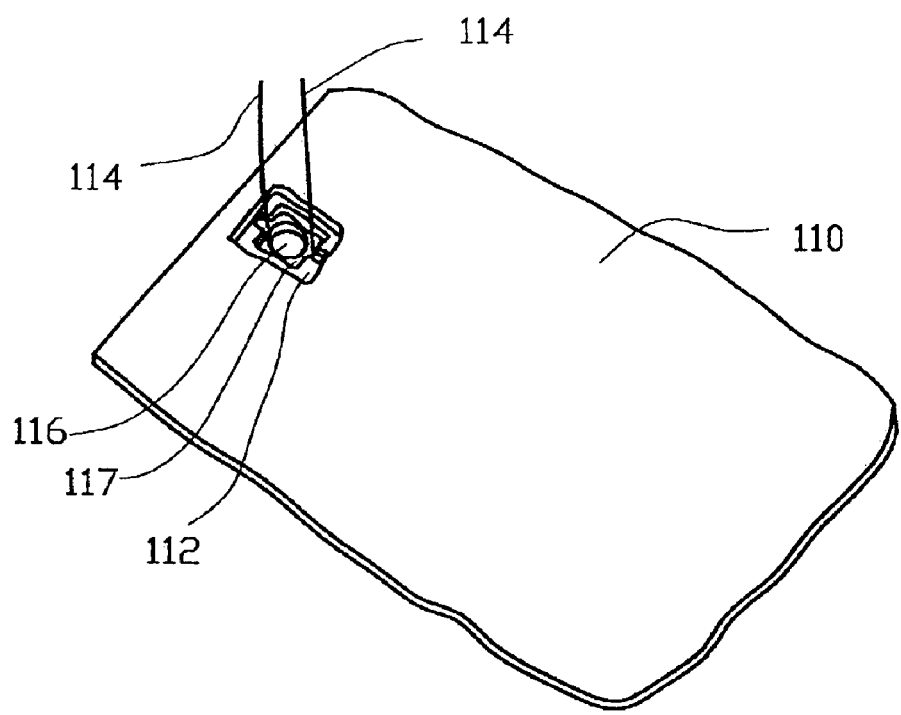
FIG. 8 shows two ends of the antenna coil pulled out from inside of the card, and the formation of a third trough, according to the present invention.

As shown in FIG. 7, an upper trough 112 is formed on the card 110 by milling. This trough 112 is sized to house a wider portion 113 of an integrated circuit 115 (see FIG. 9). In addition, the upper trough 112 just reaches to a depth which is immediately above the ends of the antenna coil formed of the wire 100. A middle trough 117, which is of a depth the same as the thickness of the wire 100, is formed, e.g. by milling, immediately below the trough 112. With the formation of the middle trough 117, the ends 114 of the antenna coil may then be pulled out from inside the card 110, as can be seen in FIG. 8. A lower trough 116 is formed immediately below the trough middle 117, e.g. by milling. The lower trough 116 is narrower than the upper trough 112, and is sized to house a narrower portion 118 of the integrated circuit 115. The lower trough 116 communicates with the upper trough 112 via the middle trough 117.

Figure 9:
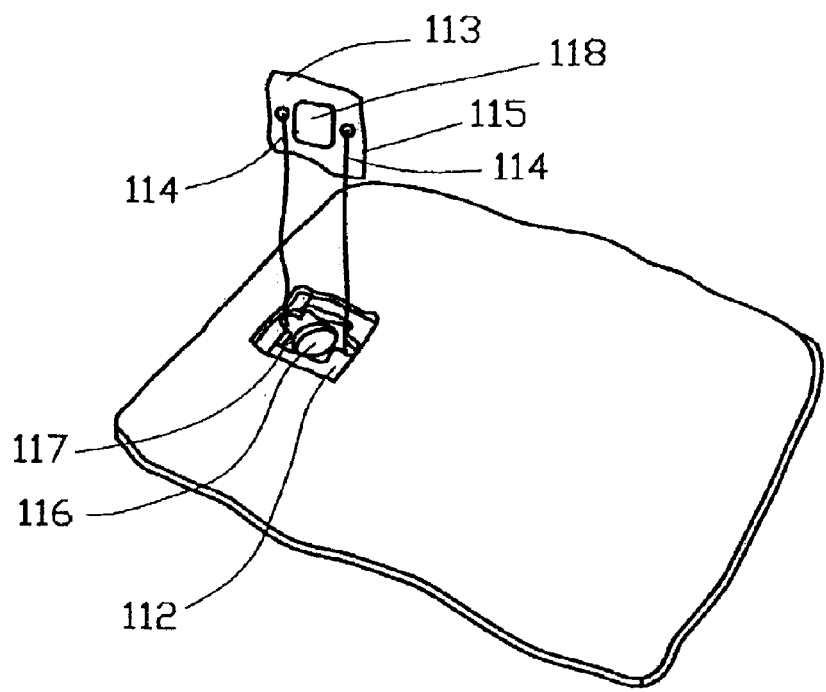
FIG. 9 shows the integrated circuit secured with the two ends of the antenna coil shown in FIG. 8.
Figure 10:
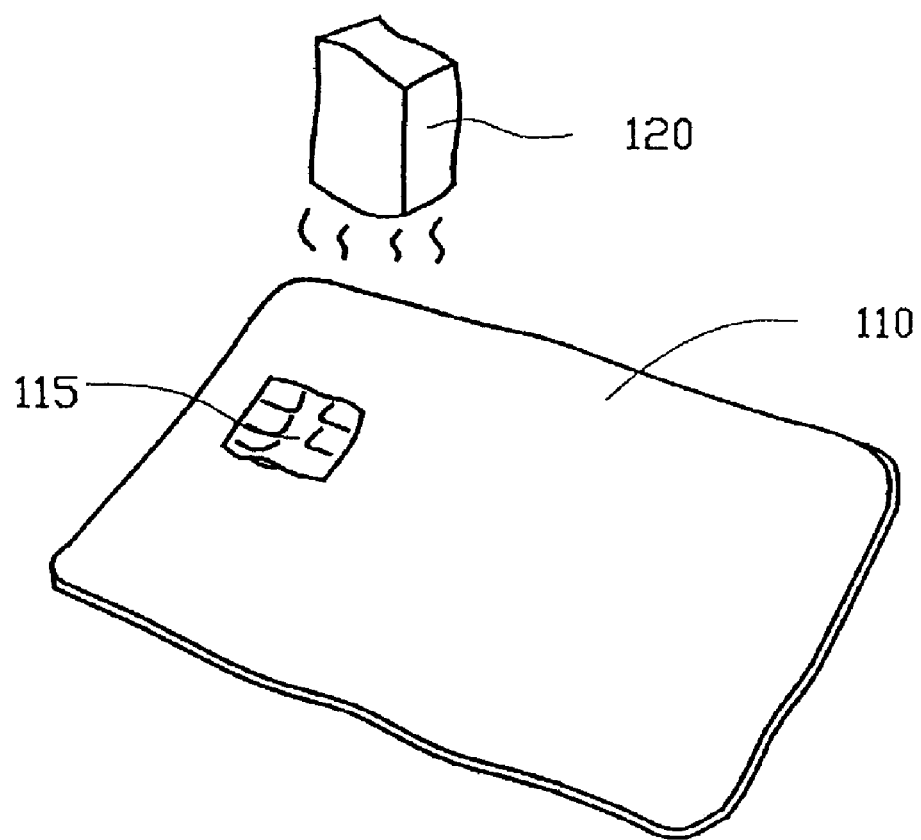
FIG. 10 shows the implanting of the integrated circuit with the card to form a combi card according to the present invention.

An adhesive material is then applied onto the upper trough 112. The adhesive material may be hot melt adhesive or liquid adhesive, depending on the specific situation. The insulating material coating the ends 114 of the antenna coil is then removed by heating. The ends 114 of the antenna coil are then secured and electrically connected with the integrated circuit 115 by soldering or thermo compression bonding, as shown in FIG. 9. The integrated circuit 115 is implanted onto the card 110 by an implanting machine of which a part 120 is shown in FIG. 10. During the implanting process, the hot melt adhesive applied onto the upper trough 112 is heated to melt and thus assists in securing the integrated circuit 115 onto the card 110. A final product combi card is thus formed.

It should be understood that the above only illustrates an example whereby the present invention may be carried out, and that various modifications and/or alterations may be made thereto without departing from the spirit of the invention.

It should also be understood that various features of the invention which are, for brevity, described in the context of a single embodiment, may be provided separately or in any appropriate sub-combinations.

What is claimed is:

1. A method of forming a card embedded with at least one integrated circuit and an antenna coil, said method including the steps of (a) embedding an antenna coil onto a core sheet; (b) laminating said core sheet with at least two outer sheets to form a laminated panel; (c) forming at least a first cavity in said laminated panel to expose part of said antenna coil; (d) pulling out at least one end of said antenna coil from said core sheet; and (e) securing said integrated circuit with said antenna coil.

2. A method according to claim 1 wherein, in said step (d), two ends of said antenna coil are pulled out from said core sheet.

3. A method according to claim 2 wherein said antenna coil is secured with said integrated circuit by soldering or thermo compression bonding.

4. A method according to claim 1 wherein said antenna coil is secured with said integrated circuit by soldering or thermo compression bonding.

5. A method according to claim 1 further including a step (f) of positioning a first part of said integrated circuit within said first cavity.

6. A method according to claim 5 further including a step (g) of forming a second cavity in said laminated panel to receive a second part of said integrated circuit.

7. A method according to claim 6 wherein said first cavity and said second cavity communicate with each other.

8. A method according to claim 7 wherein said second cavity is narrower than said first cavity.

9. A method according to claim 6 wherein said second cavity is narrower than said first cavity.

10. A method according to claim 1 including a step (h) of applying an adhesive material on at least part of said first cavity.

11. A method according to claim 1 further including a step (i) of removing an insulating coating from said end(s) of said antenna coil.

* * * * *